May 5, 1953 H. KARLBY 2,637,592
AUTOMOBILE BODY STRUCTURE
Filed July 7, 1949 8 Sheets-Sheet 1

Inventor
HENNING KARLBY
By
Curtis, Morris & Safford
Attorneys

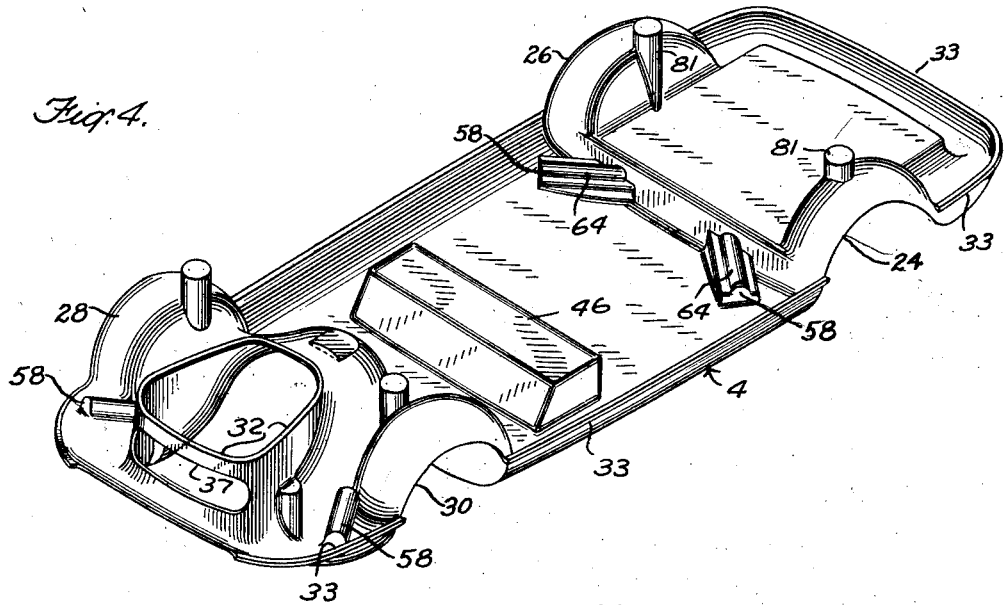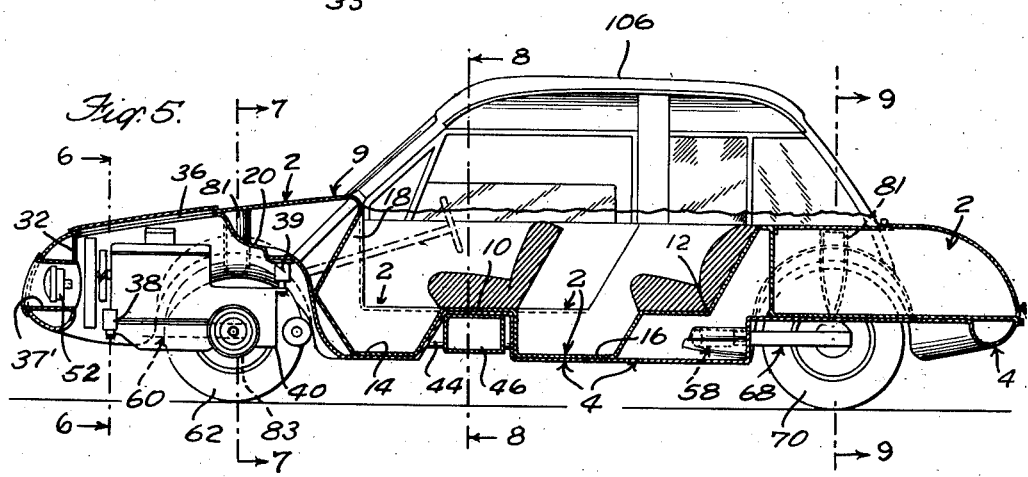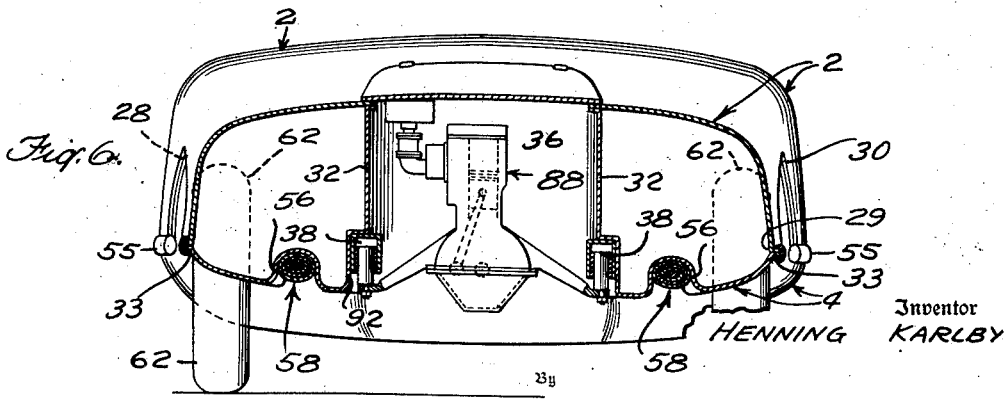

May 5, 1953 H. KARLBY 2,637,592
AUTOMOBILE BODY STRUCTURE
Filed July 7, 1949 8 Sheets-Sheet 3
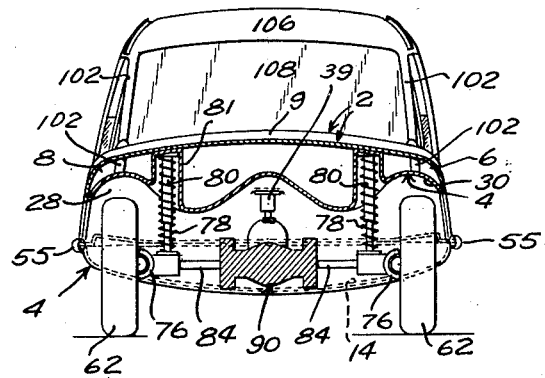
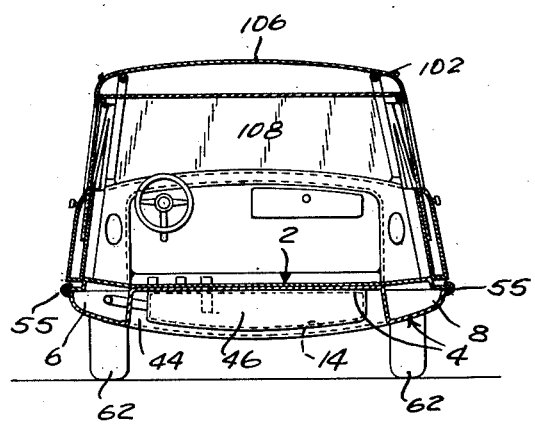
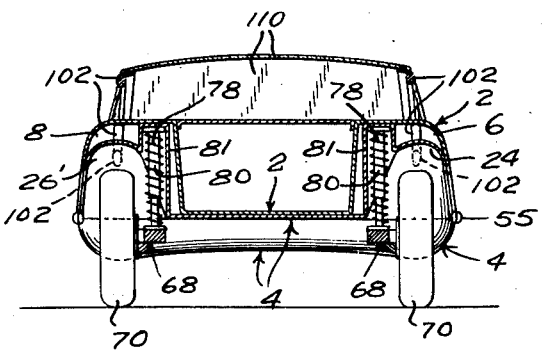
Inventor
HENNING KARLBY
By
Curtis, Morris + Safford
Attorneys May 5, 1953  H. KARLBY  2,637,592
AUTOMOBILE BODY STRUCTURE
Filed July 7, 1949  8 Sheets-Sheet 4

Inventor
HENNING KARLBY

By
Curtis, Morris & Safford
Attorneys

May 5, 1953            H. KARLBY            2,637,592
AUTOMOBILE BODY STRUCTURE
Filed July 7, 1949            8 Sheets-Sheet 5
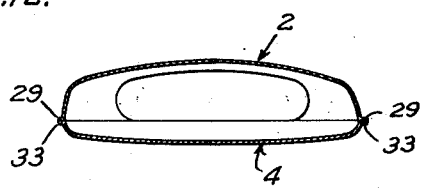
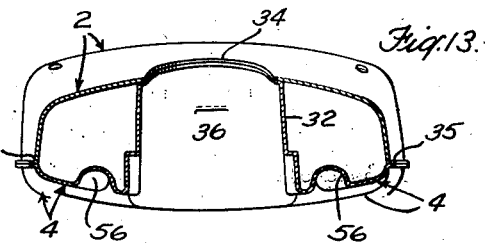
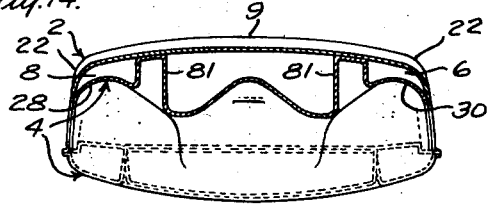
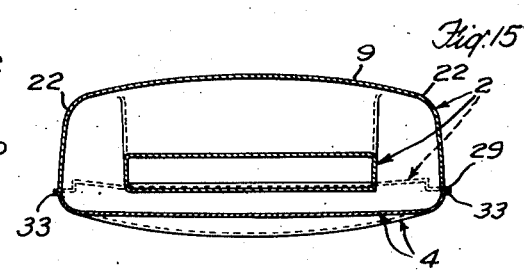
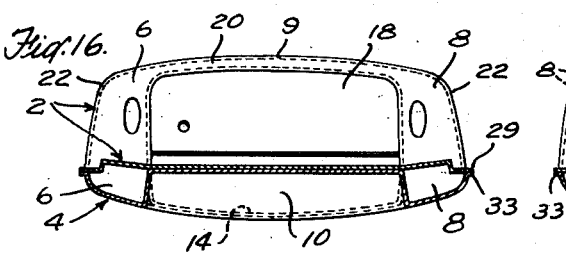
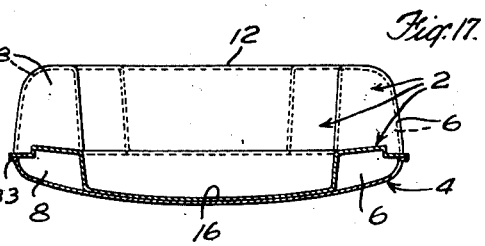
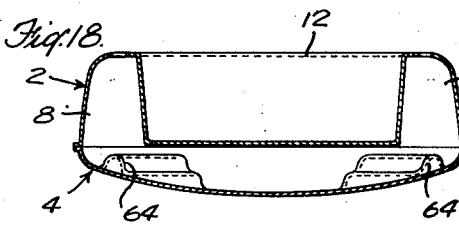
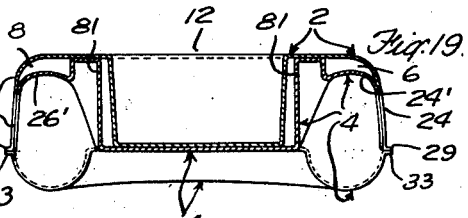
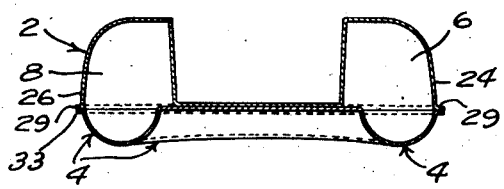
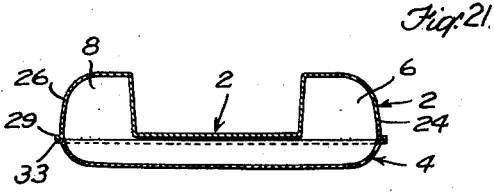
Inventor
HENNING KARLBY
By Curtis, Morris & Safford
Attorneys

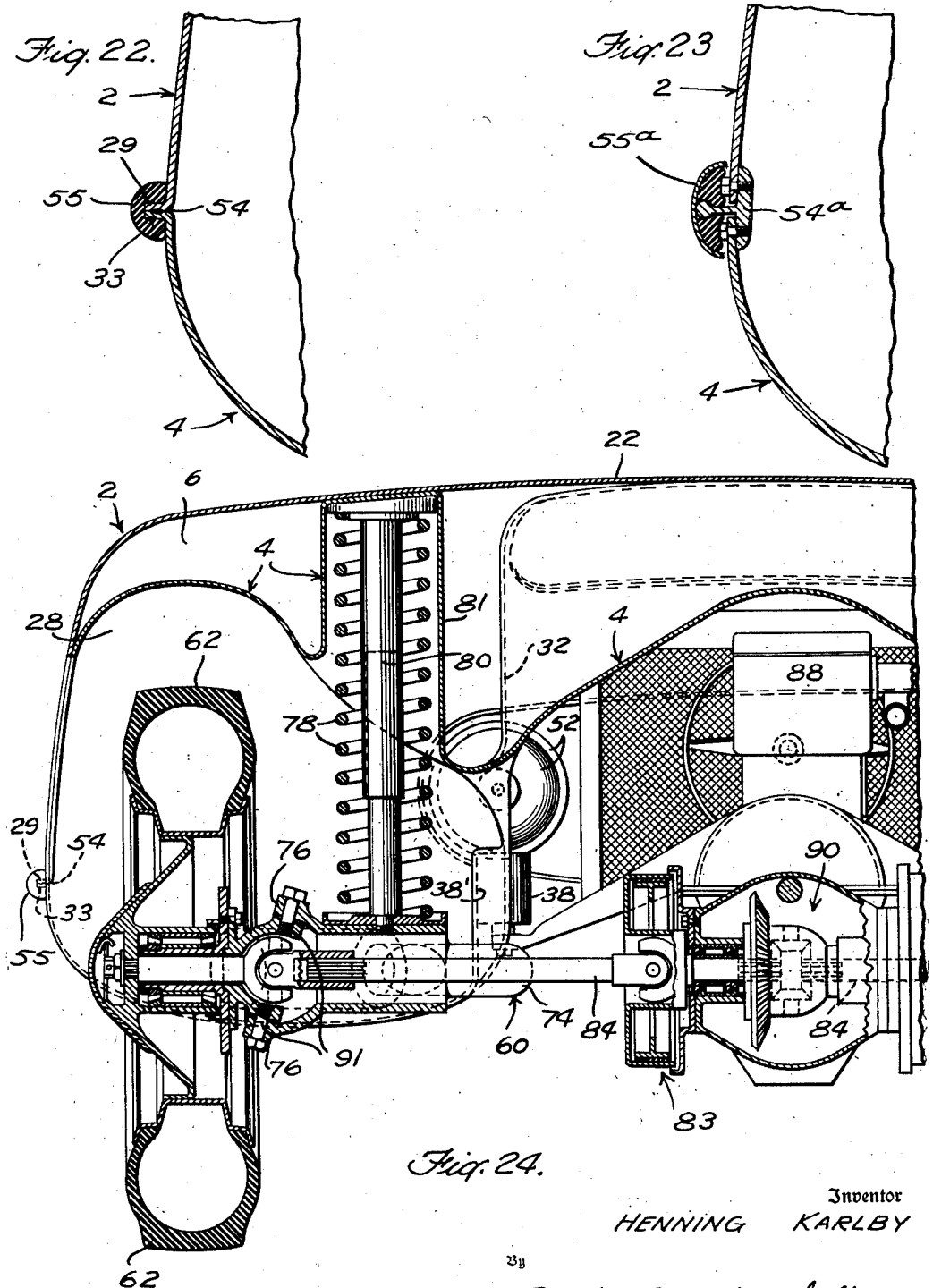

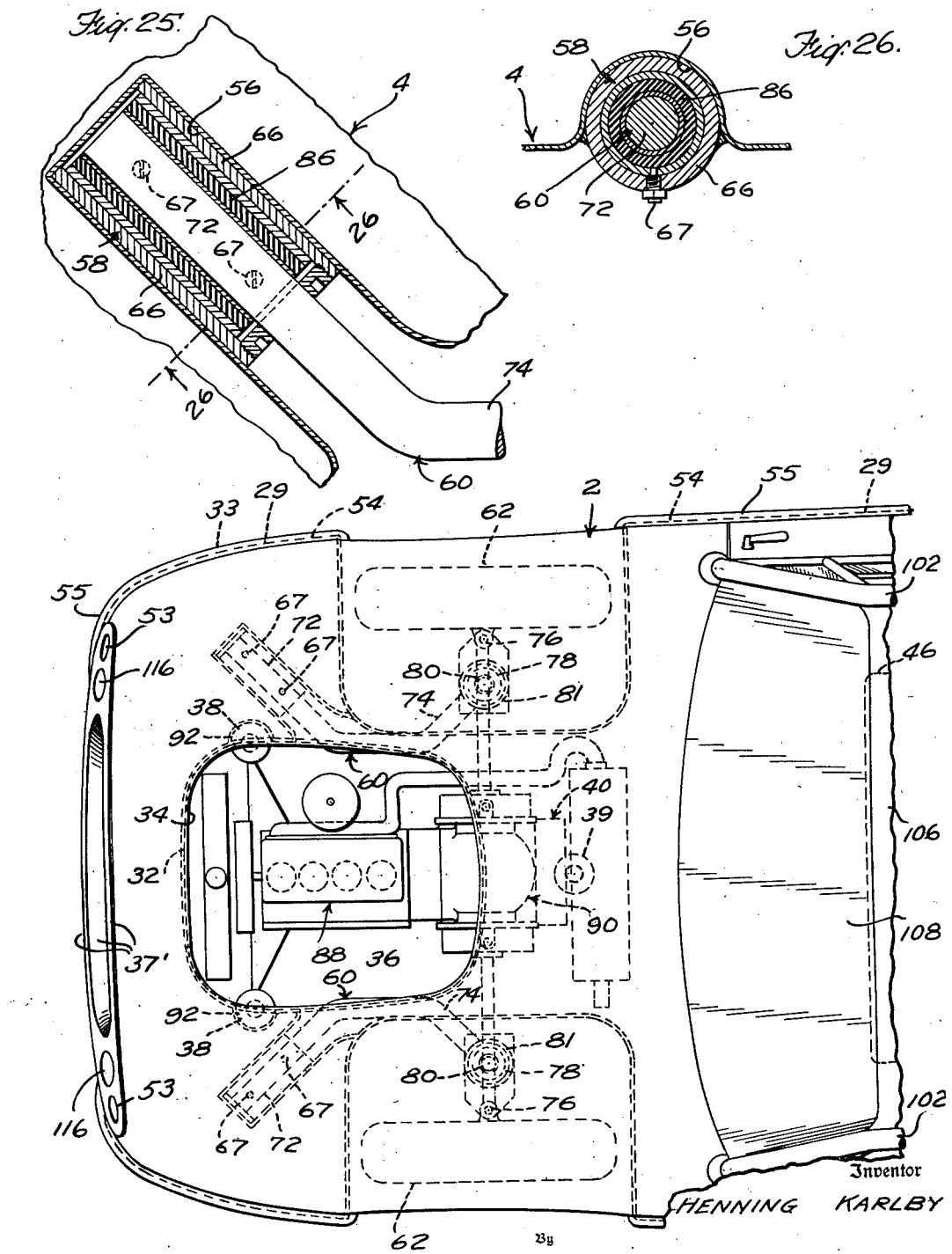

May 5, 1953　　　　　H. KARLBY　　　　2,637,592
AUTOMOBILE BODY STRUCTURE
Filed July 7, 1949　　　　　　　　　8 Sheets-Sheet 8

Inventor
HENNING KARLBY
By
Curtis, Morris & Safford
Attorneys

Patented May 5, 1953

2,637,592

UNITED STATES PATENT OFFICE 2,637,592

AUTOMOBILE BODY STRUCTURE

Henning Karlby, Pittsburgh, Pa.

Application July 7, 1949, Serial No. 103,519

11 Claims. (Cl. 296—28)

This invention relates to passenger automobile structures of the so-called "pleasure car" type, and has for its general object to strengthen and lighten such structures and at the same time to improve the overall efficiency, stability, rideability and durability of automobiles, while improving their fitness for quantity production.

A further object is to reduce the capital investment in dies, jigs, etc., required to produce an automobile and also to reduce the hours of human labor devoted to the production of each car.

The structure of the present day passenger automobile is an inefficient and expensive conglomeration of main structural members, supplementary fittings and sheet metal weather shields. The weather shields, such as the fenders, and much of the body, are essentially non-structural in present automobile structures, and therefore, because of their light construction, require secondary members for the support and location thereof and heavier non-structural members hung on the exterior as bumpers to protect the lighter fenders and body.

It has been proposed to weld frame members and body skin, i. e., the structural members and weather shields, into a unit type body, and in the case of some of the smaller European cars a part of the structural framing has been made of the same sheet metal as the body skin or weather shield by bending or folding it locally into angle or box sections. Such structures have had to be built up of numerous pieces held in complicated jigs for assembly and welding, and may be subject to serious trapped stresses as a consequence of this method of manufacture. Nor have they realized the hidden possibilities of savings in material weight, and production cost or of structural simplification and improvement of operating efficiency, safety and comfort which are achieved by the present invention.

The bending and twisting resistance required in the modern commercial automobile structures is supposed to be furnished by a combination of the frame and the body, at best rigidly welded together. However, since the outer sheet metal thickness of the body is about one thirty-second of an inch only, it is quite unstable by itself and must be supported and braced by a very large number of secondary framing elements of highly complicated shape. This leads to a very laborious and very expensive process of bringing the numerous parts needed for such a structure into correct alignment.

In spite of the complication of the present automobile structure and the high resultant cost thereof, the structural efficiency of this framework is low. Such a body-frame assembly weighing from 1500 to 2000 pounds still has no more twisting and bending resistance than that of a tube weighing only 100 pounds.

In such a body-frame construction the protection provided for the passenger in case of collision is quite incomplete. The two outside passengers on the passenger seat straddle the main frame members of a conventional car and are thus protected only by the thin sheet metal of the body. This sheet metal is so weak that instead of serving as a shield it has to depend upon bumpers, etc., for protection against damage by such minor impacts as result from parking; and yet these sheet metal stampings represent the largest part of the investment needed to build automobiles, namely, the investment in body and fender dies.

This expensive structure, with its comparatively low bending and twisting resistance and its lack of protection for the passenger, houses a power plant located at the front for driving the rear wheels. This rear wheel drive not only is the cause of much of the directional instability of an auto in operation but also brings about a weight distribution which leads to still more instability. Furthermore, although it is recognized that wheels individually suspended from very soft springs are the only means of assuring efficient ground adherence and freedom from vibration, it has been found impracticable to incorporate such individually suspended wheels in existing automobile structures by reason of the inability of such structures to furnish the bending and twisting resistance necessary in order properly to control such a suspension.

In attempting to streamline automobile bodies and also to increase the weather shielding, the accessibility of the mechanical parts of the automobile has been greatly reduced. In fact the inaccessibility of such mechanical components of the present day automobile structure has reached a point where removal of the entire front wheel and spring assembly is necessary in some cars if the engine underpan is to be disengaged. Moreover, the very large number of parts involved in the present body-frame structures require two miles of assembly line.

An important object of the present invention, therefore, is to replace the conglomeration of parts making up the body and frame structure of the present day automobile by what is essentially a single member of vastly superior strength, lower weight and greatly reduced assembly cost, and pleasing appearance, while leaving free access to all mechanical components of the automobile.

Not only does the invention aim to increase the structural strength and reduce the weight and assembly cost of automobile frame and body structures, but it further aims to increase the overall efficiency and the operating stability of automobiles.

The unitary structure of the present invention not only replaces the conglomeration of parts making up the frame and body structure of the present day automobile, but is so designed that it will resist both bending and twisting, that it will serve as an effective shield for the occupants, that it will be so light that it will impede acceleration very little, that it will have low air drag, and that any obstruction of vision will be minimized as much as possible. To this end the invention aims to provide a passenger body structure which is essentially and in its own design such a highly efficient beam-shaft as to serve in itself the functions of the normal frame and is of such high local impact strength as to serve in itself the functions of impact shield and bumpers.

By the term "beam shaft" used herein is meant a hollow structure having external walls adapted to serve like the walls of a box beam to resist bending, but also curved without sharp corners substantially throughout its periphery, so that it acts also as a shaft to resist torsion.

The present invention achieves these objects first by utilizing structurally nearly all the material used in the automobile and by making the body and fenders in a unitary beam shaft structure, a closed box beam without sharp corners and enclosing the largest possible cross sectional area.

The best shielding of passengers and the greatest economy in construction is achieved in my invention by giving the shell a simple functional shape and constructing it from two stampings (or a very few smaller parts when the investment for large stamping presses is not practicable). With this structure I need no secondary supporting structure whatsoever. Furthermore, according to my invention all mechanical components are external to, i. e., are not confused in, the beam shaft structure. These mechanical parts are connected to the tubular beam structure in local indentations which, because of their relatively short radius of curvature, have a high dome strength for receiving and distributing forces transmitted from the attached parts.

Stated in another way, the invention contemplates a vehicle structure in which, after delineating all of the spaces required (1) for operating parts; (2) for access to the operating parts; (3) for carrying space and (4) access to carrying space, and the limiting planes of (a) ground clearance, (b) height, (c) width, (d) length, and (e) lines of sight for driver and passengers, a continuous space between and around these is enclosed by a hollow sheet metal shell of gauge adapted to provide necessary structural strength, smoothly curved in all directions and having a surface smoothness providing low air resistance and quiet air flow.

By virtue of this highly rigid structure the invention contemplates a further significant improvement in the combination with this of a very simple and rugged individual wheel mounting and springing.

Still another aim of the invention is to take full advantage of such a combined frame and passenger body structure with its superior overall strength and resistance to deformation by a rearrangement of the mechanical elements of the automobile contributing much to its stability and rideability.

An important object of the invention is to eliminate the extraneous non-structural parts that were hitherto required as separate parts and also the frames and fastenings which were required for the support and positioning of such essentially non-structural elements. To these ends the invention contemplates making a self-framing passenger body structure substantially entirely with the exception of the top and a relatively few fittings, from sheet metal of relatively heavy gauge, i. e., substantially stronger than has heretofore been used for the body skin and lighter than is ordinarily used for framing automobiles of similar capacity and performance. Advantageously, taking full advantage of the invention, the number of preformed shells required for assembly into the improved self-framing body structure is reduced to two which can be stamped from heavy sheets on production presses.

The invention in it broader aspect gives flexibility of design to meet functional requirements. In its specific embodiment as hereinafter set forth, the passenger space is first determined beginning with the desired comfortable seats for three people on each of two seats and with comfortable spacing for feet and legs. Beyond this passenger space at each end the wheels are arranged and motor and luggage compartments are extended therebeyond at the front and rear respectively. With these several spaces for power plant, for passengers, for luggage and for wheels determined, a space between and around them is enclosed by a beam shaft structure having the required road clearance in its lowest parts and having necessary clearance below lines of sight required for driving. The shape shown is a design of functional art, but many other designs both decorative and functional can be used, the designer having a wide latitude of choice by virtue of this invention.

Other objects and important features and advantages of the invention to which attention has not specifically been directed hereinabove will appear in the following description and claims when considered in connection with the accompanying drawings.

Although in this specification and the accompanying drawings I have shown and described a preferred embodiment of my invention and have suggested various modifications thereof, it is to be understood that these are not intended to be exhaustive nor limiting of the invention, but on the contrary are given for purposes of illustration in order that others skilled in the art may fully understand the invention and the principles thereof and manner of applying the same in practical use and be enabled to modify and adapt it in various forms each as may be best suited to the conditions of a particular use.

In these drawings in which like reference characters refer to like parts throughout:

Figure 4 is an isometric view of the lower of the two shells required to produce the illustrative embodiment;

Figure 5 is a view in central, longitudinal vertical section, showing the shells of Figures 3 and 4 assembled into the self-framing passenger body structure of the present invention, these shells being welded together at their meeting edges;

Figure 6 is an enlarged view in vertical transverse section taken on line 6—6 of Figure 5, but with the motor shown in front elevation;

Figure 7 is a view in vertical section taken on line 7—7 of Figure 5;

Figure 8 is a transverse vertical section taken on line 8—8 of Figure 5;

Figure 9 is a transverse section on line 9—9 of Figure 5;

Figure 1:
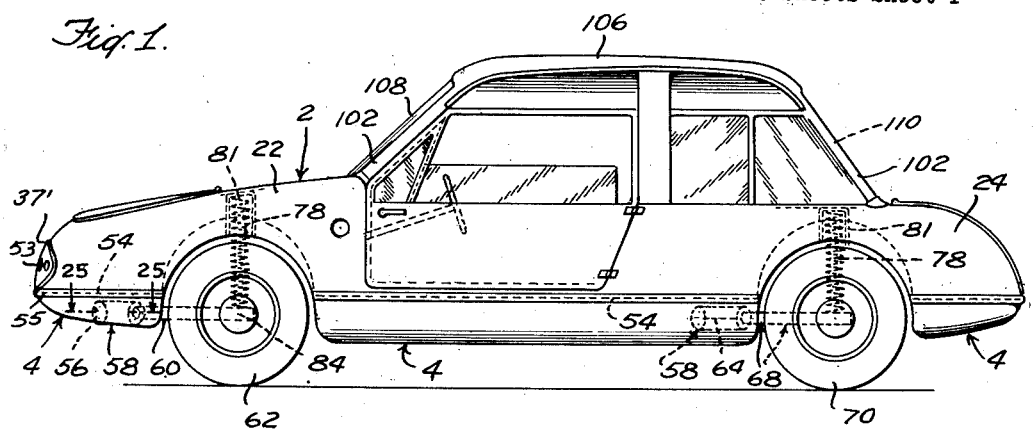
Figure 1 is a side elevation of the complete automobile having a top attached to the basic body structure.
Figure 11:
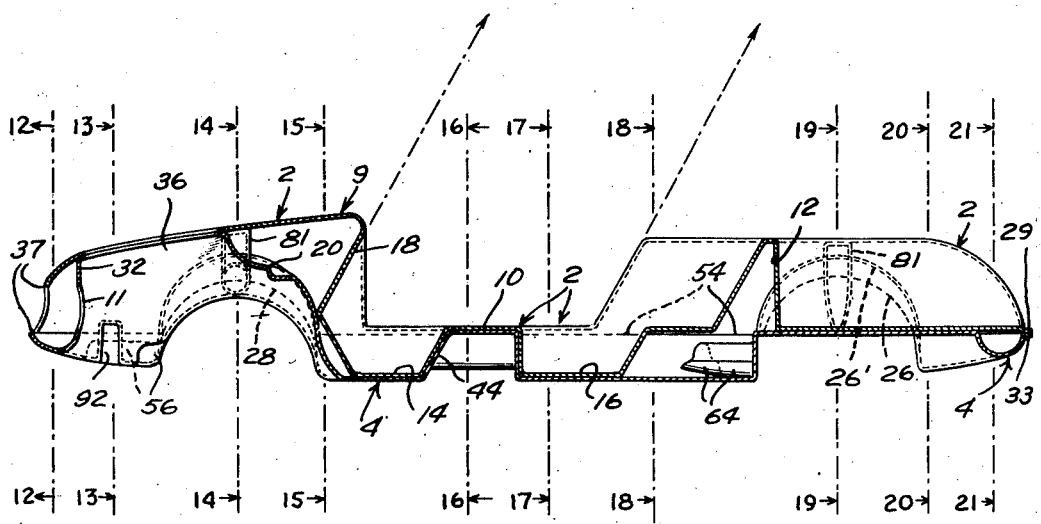
Figure 11 is a longitudinal, vertical section taken through the upper and lower shell assembly.
Figure 28:
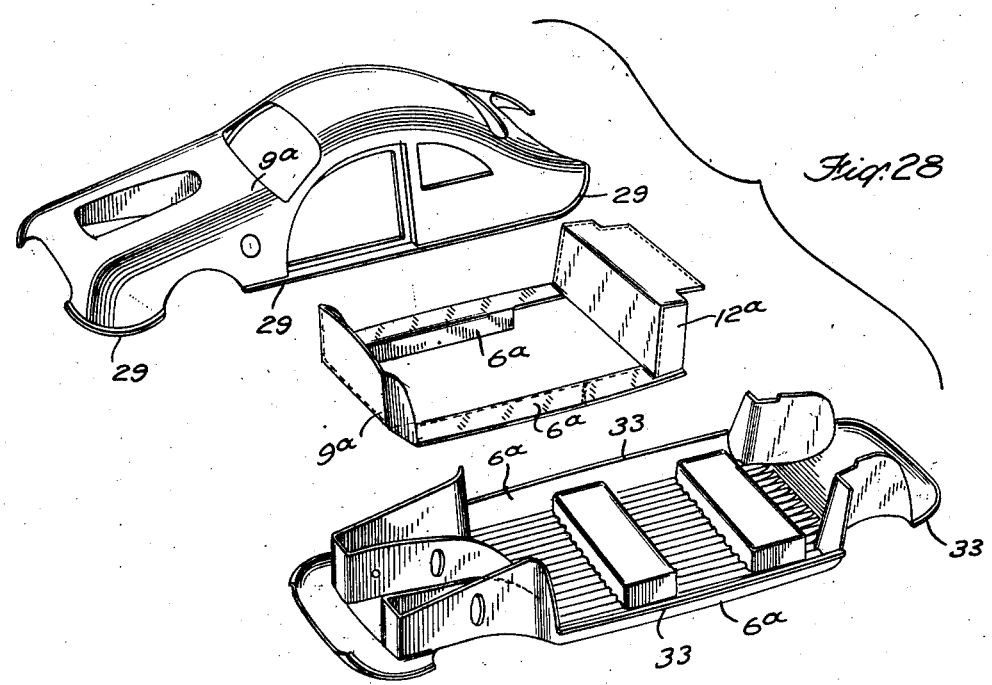
Figure 29:
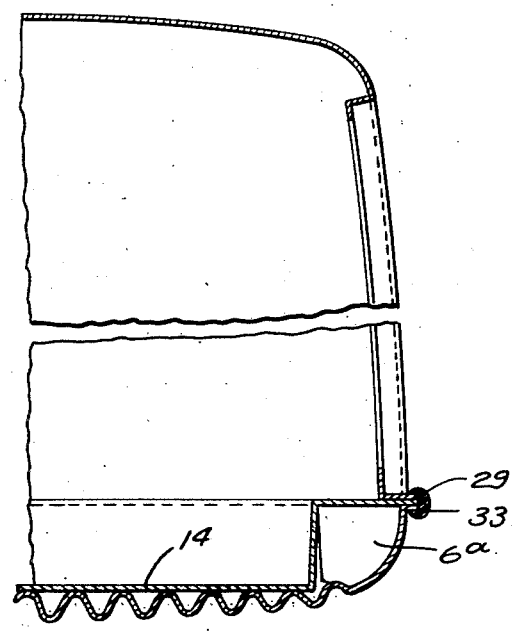

Figures 12 through 21 inclusive are diagrammatic sections through the self-framing, body structure respectively on the lines 12—12 to 21—21 of Figure 11;

Figures 22 and 23 are detail views showing how the shells may be secured together by bolts or spot welding;

Figure 24 is a fragmentary sectional view of one front wheel and associated parts, particular the brake mechanism;

Figure 25 is a fragmentary sectional view taken on line 25—25 of Figure 1;

Figure 26 is a cross-section taken on line 26—26 of Figure 25;

Figure 27 is a fragmentary phantom plan view of the front end of the automobile;

Figure 28 is an exploded view of the parts which make up a self-framing body in another embodiment of the invention; and Figure 29 is a fragmentary section through a door sill showing how the parts of Figure 28 are welded together into a box beam structure.

Figure 3:
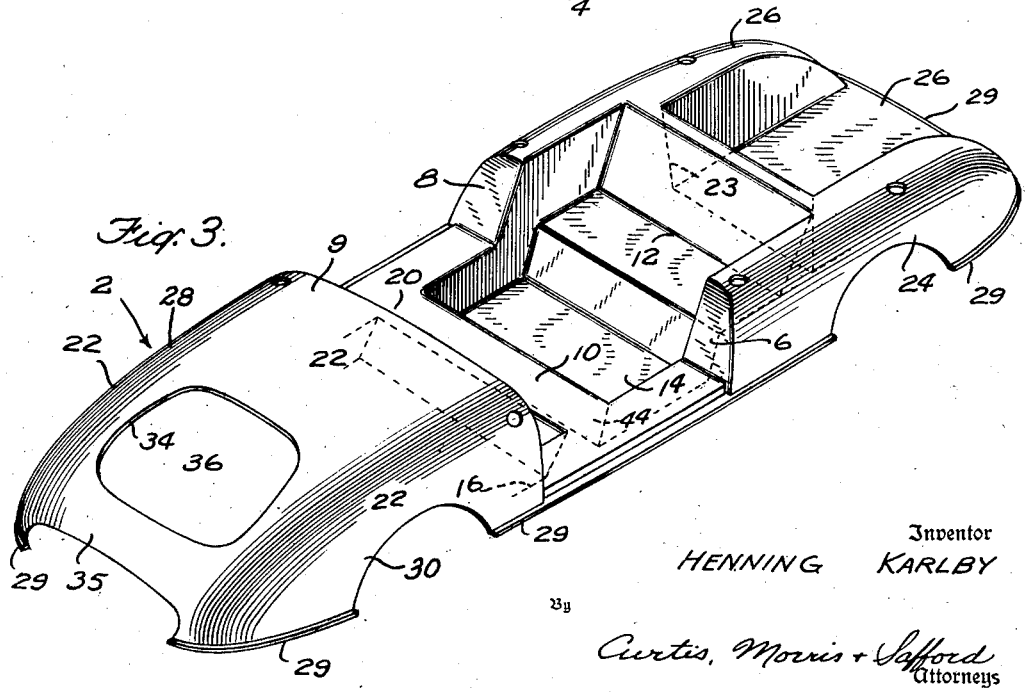
Figure 3 is an isometric view of the upper of two preformed sheet metal stampings employed in producing the embodiment of the invention herein illustrated.

In the embodiment of the invention shown in the drawings, in which the basic self-framing passenger body structure is reduced almost to its ultimate simplicity with the main shell made in two halves 2 and 4, shown individually in Figures 3 and 4, it will be seen that the upper shell has been so designed that not only does it provide its essential component shapes of which the assembled structure is made up, but that it lends itself to formation by stamping or deep drawing from sheet metal, e. g., between dies on a hydraulic press.

As shown, the two shells 2 and 4 combine to form an overall beam-shaft, i. e., the two shells when welded or otherwise secured together form a hollow structure having a high stiffness/weight ratio because its box-beam cross-section. Moreover, these shells are formed so as to provide box-beams peripherally of the automobile, especially across the front and along the sides. As shown, an engine well is substantially surrounded by a torodial "box beam" section and the passenger space is reinforced by transverse box beam sections. Thus the body is in effect a series of spaces for engine, passengers and luggage, each surrounded by box beam structures integral with the other parts of the body. At the same time the lower surface of this body is smooth to give relatively little air drag, and to give high impact resistance by lying flat in a horizontal plane, parallel to the direction of destructive impacts.

The upper shell 2 is shaped to form the upper and inside faces of two longitudinal box beams 6 and 8, and the connecting integral cross beams 9, 10, and 12 located under the cowl and beneath the passenger seats, respectively, the floor of the passenger compartment being shown at 14 between the rear and front seats and at 16 between the front seat and the dash 18, which is integral with the overhanging cowl 20 which, in turn, is integral with the toroidal frame portion which serves as hood sides 22 and extends over the front wheels and forms a part of the front wheel fenders. The upper part of the rear cross beam 12 is shaped to support the back cushion for the rear seat and to constitute a part of a stiffening cross beam shape of which the upper wall 23 of the baggage compartment constitutes another part. It will be seen that the box beams 6 and 8 are carried up over the rear wheels to form a part of the integral rear wheel fenders 24, 26.

The lower shell 4, as shown in Figure 4, is likewise so designed that it can be pressed from sheet metal upon a stamping press by drawing dies. As shown the shell 4 is shaped to cooperate with the corresponding beam-forming elements of the upper shell 2 to form the structurally strong longitudinal box beams 6 and 8, the cross beams 9, 10, and 12 etc. It is also shaped to provide recesses 24 and 26 for the two rear wheels, and 28 and 30 for the two front wheels, respectively, in such manner that when the lower shell is connected to the upper shell the lateral box beam stiffening of the overall structure will be carried forward and rearward through the wheel fenders so that the fenders are important structural elements of the self-framing body structure.

This box-beam structure in the body section is best shown in Figure 8. In this area the beam height is limited on the bottom by necessary ground clearance and on the top by the height of a convenient door sill and the need for keeping the floor low to bring the center of gravity as low as possible. Essentially this section consists of the two box beams 6 and 8 joined by an integral double floor. With the flat floor and bottom areas a relatively high resistance to lateral impact is secured, but if greater longitudinal stiffness is desired, the bottom member may be corrugated and the tops of at least some of the corrugations spot welded to the floor. Cross bracing is furnished by the turned up portions at the front 9 and back 10 of this floor area (as best seen on Figure 5). The upper and lower sections may be in contact and spot welded to avoid relative motion and consequent noise, or they may be spaced e. g., by a layer of sound deadening material.

Figure 9 shows a section through the trunk and rear fenders. This consists essentially of an elliptical section box beam 6 or 8 above each wheel and suitably caved in on its under side to provide clearance from the wheel with extreme spring deflection and to form a splash curtain at its outer edges. These two boxes are joined by the integral floor and front and rear side of the luggage tray. The under side of the fender beams are locally recessed at 81 to receive the ends of the compression springs, as more fully described below. A section through the car at the front wheels as shown on the right of Figure 7 is similar, except that it has a single broad elliptical tube caved in under the wheels and bellied slightly downward for strength between the fender portions, as there is no central space required above or between the structural beam or beams in this cowl area.

It is significant that, as shown, the radius of curvature of the upwardly and downwardly bent border areas is less than twice the height of the curved border. This gives a high degree of rigidity and strength against impact and thus constitutes a built-in bumper extending entirely around the car. This effect is enhanced by the out-turned flanges 29 and 33 on the sections 2 and 4 by which they are secured together (see Figure 22) and by the decorative bumper strip thereon.

It will further be seen (Figure 4) that the lower shell has pressed into it, in the forward area between the cowl 20, the inner faces of the front wheel fenders and the front end of the auto, an upturned flange 32, roughly annular, around a well 36 for the power plant unit. This and the peripheral edge 33 fit with corresponding flanges 34 and 35 turned down from the upper shell 2 so that this forward area is roughly toroidal in form, and with an elliptical, toroidal mouth part 37, the edges of these parts being welded or otherwise held together.

The cowl 20 and the top of the hood 22 together with the portion of shell 4 which underlies them form, in the assembled structure, another strong box beam for transverse stiffening to the motor and transmission, and to withstand its torque and thrust, as well as for impact resistance in event of collision in this area.

As hereinafter more fully set forth, the motor and transmission are advantageously built as a unit power plant that can be supported as a unit in the toroidal portion 32, 34, 35 36 by resilient mountings 38 and 39 welded to the flange 32. This power plant unit can thus be bodily removed from the structure.

The transmission is advantageously connected to the front wheels for front wheel drive; and, as shown in Figures 5 and 24, has its change speed gear box 40, or other torque convertor transmission directly behind the motor with its output shaft at a lower level than its input. By this expedient the differential has been placed forward of the transmission and under the rear main bearing of the motor, thus giving a most compact arrangement.

The well formed by flanges 32, 34 in which the motor is located, is advantageously open at the bottom to permit access to the motor and/or transmission for repairs and for bodily removal of the motor and transmission unit to facilitate major repairs and replacements. This also exposes the motor for circulation of air for cooling. The well 36 is open at the front through the mouth ring 37 to permit air circulation either through the radiator of the motor cooling system or directly around the motor, in the case of an "air-cooled" unit. The well opening 36 at the top of the hood is provided with a hinged cover, for service access to the top of the motor.

Figure 2:
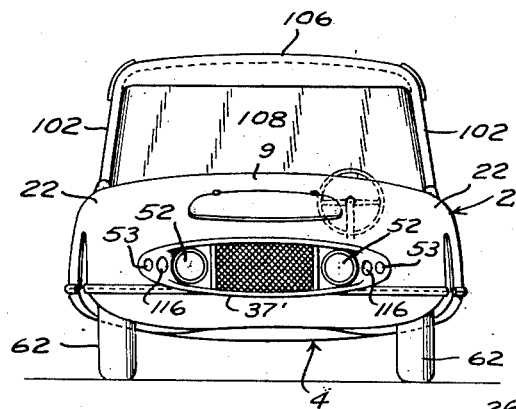
Figure 2 is a front elevation showing the arrangement of the air intake, headlights, etc.

A cross section through several parts of the motor well is shown in Figures 6 and 7. On the plane of Figure 6 the body consists of the two box beam portions 6 and 8 here generally D-shaped and constituting parts of the front end torus. At the bottom are shown the mountings for the front wheel suspension to be described below. The light cover which closes the top of the motor well is shown in Figures 1 and 2.

In Figure 7 at the left is shown how the beams 6 and 8 merge into an overall box beam section in the cowl portion to form the rear of the toroidal motor well.

In Figure 11 the parallel sloping dash lines indicate the direction of draft of the stamping dies. It will be seen that all parts can be drawn with no undercuts by a single die from a single piece of sheet metal. The design also lends itself, where smaller stampings are preferred, to division into three stampings, a forward section including the cowl and toroidal parts, a central section for the dash, the passenger space and back of the rear seat, and a rear section including the luggage compartment and rear fenders.

The part of the lower shell 4 which nests with the corresponding part of the upper shell 2 to form the cross beam 10 leaves a recess 44 in the bottom of the assembled body in which can be located the gasoline tank 46, preferably a little above flush relation with the bottom face of the car body.

Those parts of the two shells 2 and 4 which are brought into face contact at the floor portions 14 and 16 and at the top of the recess 44 of the assembled structure may be spot welded or otherwise secured together to increase the stiffness of the structure and to prevent any noise-generating relative movement thereof; or a sound damping material 48 e. g., a rubber block or blocks or asphalt impregnated fibrous board may be assembled between them so as to damp any resonance within the structure.

At the front end of the assembled structure, the opening into the motor well 36 is reinforced by an elliptically toroidal ring 37' welded edge-to-edge to the two shell 2 and 4. The elliptical opening, as shown, is of sufficient vertical and transverse dimensions not only to provide a mouth for cooling air for the radiator and the engine, but also to permit the location of the headlights 52 in or behind this opening.

Figure 2 shows the toroidal mouth 37' with the headlamps mounted in its extremities recessed enough for protection from minor collision but not so far as to interfere with light distribution over the road. The open throat between the headlamps which serves as the fresh air intake for cooling, may if desired, also furnish ventilation to the body interior through communicating openings in the beams 6 and 8. This toroidal mouth may also constitute the "bumper," as its relatively short radius of curvature gives it high strength against denting. To this end it may be covered with flush-fitting bright metal strips or grills, etc. Parking lights 53, turn indicator lights, stop lights, etc., may be mounted in the fenders as shown in Figure 2.

One advantage of the tubular structure, and particularly the longitudinal box beams, is its availability as a duct for ventilating and heating air and for wiring, piping, etc. When used in this way, access openings must be provided and it is therefore recommended that the entire structure be dipped in suitable rustproofing or protective surface coating materials. It is also desirable to coat the interior with a sound deadening material, which can be done by filling it with a viscous solution or fused bath of asphalt or rubbery material and then draining, with or without blowing in granular cork, sawdust, cotton flock, or other like material to catch on the sticky coating and be held there on cooling.

From the foregoing description and from an inspection of Figures 3 to 8 it will be seen that, when the two shells 2 and 4 are brought together, their outer edges meet to form a continuous seam 54 extending peripherally along the outside of the box beams 6 and 8 and those extensions of the box beams 6 and 8 which form the front and rear wheel fenders and around the inside of the well 36. In the preferred embodiment of the invention the shells 2 and 4 are preferably secured together at the seam 54 by a continuous edge weld. This may be a continuous autogenous weld, but ordinarily it is better either to make a continuous braze or to leave flanges as shown in Figure 22 and spot weld these at appropriate intervals.

If greater repairability is desired, it is of course possible to secure the two shells together by removable bolts, which may engage a T strip 54a and be covered by a decorative strip 55a which snaps onto the end of the web 54a, as shown in the small detail view in Figure 23, but the permanent continuous weld is recommended. The need for access to the interior is more apparent than real. By elimination of the numerous nonstructural parts and the utilization of almost all of the steel so that its strength is utilized in the structure, the entire shell can be made of steel of the thickness normally used for bumpers and still achieve substantial savings of weight and cost.

It is evident that if the body itself is built like the present bumpers, not only are the passengers more perfectly protected against serious collision accidents, but the body itself is proof against crumpling and denting except in the most severe collisions.

Minor dents will be filled, as in present practice, with body solder. If broader dents should occur they are best repaired by brazing in a piece of lighter steel formed to the proper shape so as to bridge the dent and grinding the brazed seam off smooth. It is further believed that the cost of manufacture of the combined frame and body structure when in mass production will be such that it may be considered an expendable element of the automobile to be replaced where damage is such as to require major repair.

It will be noted that one of the advantages obtained from driving the front wheels of the car, as provided for in the above-described design of the combined frame and body structure of the present invention, instead of the rear wheels, is the elimination of the long drive shaft under the floor of the car. This permits lowering the floor without reducing the ground clearance and at the same time eliminating the unpleasant hump in the floor. By this means also I bring the center of gravity of the structure lower than has heretofore been possible and thus give greater stability to the car. This is further aided by the trailing arm suspension which allows the motor to be carried between the wheels and yet at almost minimum ground clearance. This same result is also aided by the avoidance of axles and axle shafts and housings extending across under the body structure of the engine. Moreover, by eliminating axles and by including the differential and brakes in the power plant unit, this feature of my invention has so far reduced the unsprung weight as to give a very much smoother ride over rough roads, notwithstanding the overall reduction of weight.

Since a shell is strongest against continuous or well distributed stresses, concentrated loads introduced into the shell 2—3 require load distributing fittings, and since every loading point is a potential source of undesirable vibration nodes, I reduce such points to a minimum by a special suspension arrangement. To this end each wheel is carried on a single individual trailing arm, hinged at its front end to the under side of the combined frame and body structure, and the power plant is suspended at three points only, each cushioned by a vibration absorbing and damping pad. These power plant supports are so arranged that the plane through the two front ones and the rear one passes through or close to the center of gravity of the power plant unit.

Figure 10:
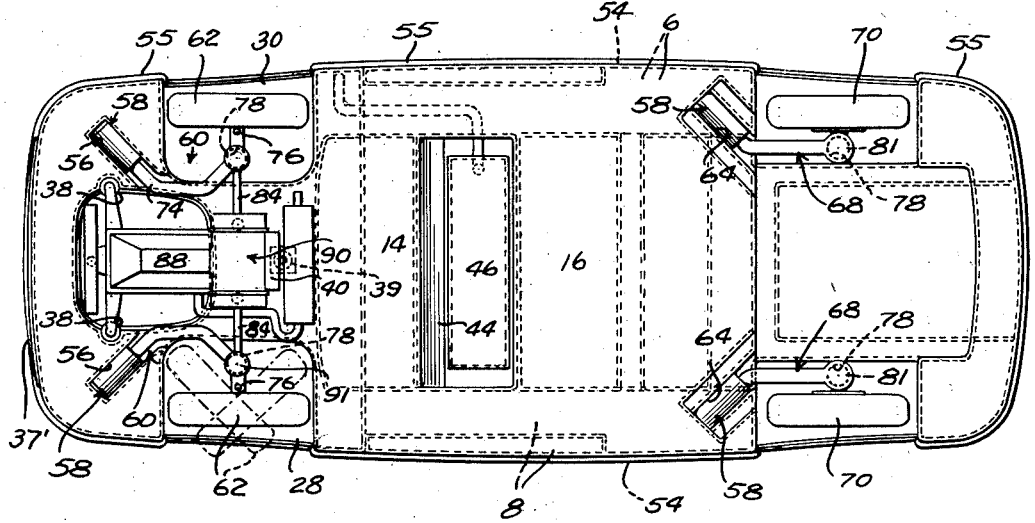
Figure 10 is a bottom plan view of a complete automobile embodying the present invention, showing the location of the wheel supports, wheels, gasoline tank, motor, driving connections, etc.

Referring more particularly to Figures 6 and 10, it will be seen that the under side of the combined frame and body structure is provided in front of the front wheel recesses with indentations or channels 56 to receive the tubular bearings 58 for the supporting arms 60 for the front wheels 62 and, in front of the rear wheel recesses, with similar indentations or channels 64 to receive the tubular bearings 58 for the supporting arms 68 for the rear wheels 70 and the body carries its rigid beam-shaft structure forward beyond these points. These tubular bearings 58 are welded in position in the respective indentations 56 and 64. As shown, these bearings are preferably inclined somewhat to the longitudinal axis of the body structure to increase the resistance to "rolling" or swaying.

The arms 60 and 68, which respectively carry the front wheels 62 and the rear wheels 70 comprise each a shaft portion 72 received in the associated tubular bearing 58, a rearwardly extending or trailing arm portion 74 and a wheel bearing portion 76. The bearing 58 comprises, in the case illustrated, an inner metal sleeve keyed to the shaft 72, an outer metal sleeve secured by set screws 67 in the tubular mounting fixture 66 welded or otherwise secured in the recess 56. (See Figure 27.)

The wheel bearing portion 76 in the case of the front arms 60 is separate and, as best shown in Figure 24, is pivoted on an axis which passes through the area of contact of the tire on the road, advantageously a short distance inward from the center of the contact area and on or preferably close to the vertical axial plane of the wheel. The cushioning spring 78 and the shock absorbers 80 are connected to the end of each wheel arm 60 and 68 at or just beyond the point where the wheel bearing portion joins the trailing part 74 of the arm, the springs and shock absorbers being accommodated in indentations 81 in the inner walls of the wheel recesses of the frame and body structure.

The shaft or pintle portion 72 of each wheel support may have a simple bearing in its associated bearing tube 66, requiring occasional lubrication, or it may be fully secured with the necessary resilient yielding in the arm 60 or 68 or in a torsionally resilient connection between shaft portion 72 and sleeve 66 or both, instead of the rubber torsion connection between bearing tube 58 and shaft portion 72 such as shown at 86 in Figure 25.

In the embodiment shown, see particularly Figure 7, the rubber torsion sleeve does not carry the static load but serves primarily as a vibration damping means and as a shock absorber for minor road shocks, and as a supplemental suspension means tending to hold the body at a predetermined height when travelling, even though the static load would tend to push it down. As shown in this figure, the static weight of the car is carried by the coil springs 78 (or if desired by other type springs). These coil springs 78, with or without some resilient flexing of the trailing arm portions 74, accommodate the vertical movements of the wheels in passing over irregularities in the road and in absorbing shocks of up and down movements of the car. At the ordinary height of the empty car the rubber sleeves 86 are near or at their unstressed condition; but, when the wheels move up or down, they are stressed in torsion and thus add their resilient forces to those of the springs, respectively. This allows the use of a softer coil spring; it renders the springing non-harmonic and progressive and shock absorbing (damping recoil) because of the inherent characteristics of a rubber spring; and when the car is driven over the irregularities of the road it tends always to come back to the neutral position of the rubber sleeve.

If the rubber torsion spring is designed to be relaxed at, or even somewhat below, the position with the body fully loaded, so that the coil spring (or other metal spring) and the rubber torsion spring prestress one another, it will allow the use of a "soft" spring (i. e., with relatively low load/deflection rate) while holding the body to a reasonable height and range of vertical movement. Stated in another way, the rubber spring has a relatively low load-deflection rate on each side of its relaxed position which gradually increases as the deflection is increased in either direction. By combining this with another spring which not only supports the load but stresses the rubber spring oppositely to the stress produced by the load, one gets the ordinary deflection due to road shocks, with a partially or fully loaded car, into the zone of the low load/deflection rate, thus getting the benefit of a "soft" ride combined with buffer action against heavier shocks and recoil, and damping of resonance.

Any tendency of the rubber to take a permanent set from its initial pre-stressing will be counteracted by its opposite stressing under loaded conditions.

When a compression coil spring is used as shown in Figures 7 and 9, it should be combined with a shock absorber to dissipate the recoil energy in the form of heat. This can be a dashpot type shock absorber 80, which as shown can be mounted in the center of the coil so that only one mounting recess 81 need be formed in the shell 4 at each wheel.

The recess 81 is drawn into the shell 4 at the highest part of the fender so that it provides space for a very long spring, far in excess of what is possible with present day passenger automobiles, thus permitting better spring characteristics and a softer ride. If desired the recess 81 can be deep drawn so as to contact, and may be spot welded to the upper shell 2.

From the foregoing description it will be seen that each of the four wheels of the assembled structure is supported independently of all the others and is independently sprung, thus providing good ground adherence and freedom from vibration. This mounting and springing of the wheels individually is only made possible by the superior rigidity of the improved self-framing body structure of the present invention with its high resistance to twisting and bending even in the "fender" section forward of the front wheels.

The angular relations in the wheel mounts 60 and 68 although not essential to the other features of the invention, give important advantage. The small angle of the axis of shaft portions 72 to the axis of its wheel at 76 determines the height of the "roll center" and thus controls in part the tendency to roll on curves. This angle should be small, however, since a greater angle would result in tilting the axis of rotation of the wheels when they roll over an obstruction or into a hole, with the consequence that gyroscopic forces of precession would interfere with normal steering. If the angle is substantial, then there is an actual toeing in or out, as the wheel moves down or up and that will, of course, tend to steer the car to one side or the other. By adjusting this angular relation, and especially with the center of gravity kept low, one gets nearly non-gyroscopic steering and stability with freedom from roll.

The angle of the trailing arm 74 and the fact that it extends backward and down from its mounting 56 results in the horizontal component of yield to road shocks coinciding with the direction of swinging of the arm 60 or 68 under increased loading. Thus the shock imposed by an obstruction encountered by the wheel is relieved by the horizontal and vertical yield of the trailing arm.

The front wheel brakes are carried by the power plant unit at 83 so that the braking torque is applied to the driving shafts 84. This both reduces the unsprung weight and the complication of design around the steering knuckles and wheel axles and it relieves the trailing arms 60 of the direct reaction torque to the braking. Such an arrangement is well known in the art, e. g. the Cord front wheel drive automobiles. On the rear wheels the brakes will be at the hubs and secured to the trailing arms 68. Operating linkage for brakes and steering may be conventional and is largely omitted in order to show more clearly the more distinctive features of the design.

The driving shafts 84 will, in accordance with established practice for cars steering and driving the same wheels, have universal joints at the differential 90 and at the steering knuckles 91. These may, advantageously, be constant velocity universal joints, although for simplicity they are shown as conventional knuckle joints.

As hereinabove suggested, the motor and transmission of the improved automobile of the present invention are preferably located as far forward as is practicable and advantageously with the motor in front of the axles of the front wheels. As shown, the motor 88 and the transmission 40 and differential 90 are connected together in a compact unit power plant that can be removed bodily as a single package from the self-framing body structure. As stated above this unit may also include the brakes, the braking torque being applied through the drive shafts, and thus the brake fluid conduits or brake linkage etc., can be kept short and enclosed. Advantageously the muffler and exhaust pipe are also a part of or carried on this unit compactly arranged and discharging under the car, which being a tight integral sheet cannot leak carbon monoxide into the passenger space. Also shown, the self-framing body structure is entirely open beneath the motor and transmission so that when the power plant unit is disconnected from the three supports 38 and 39, the entire assembly may be dropped down through the bottom of the well 36 e. g., for repair or replacement.

In the example shown, the power plant unit is supported at three points on the self-framing body structure: at the sides on cushion supports (those shown being of the type sold as "Silent Block" by General Tire and Rubber Co.) with their outer steel sleeves secured, advantageously by welding (by which term I include brazing), in the vertical indentations for supports 38, and at the rear on the similar cushion mounting 39 secured in an indentation at the rear of the motor well 36.

The driving torque reaction tends to rotate the power plant about its center of gravity, so that the rear of the unit is driven down against its cushioned support 39. The rear wall of the power plant well is designed with a concavo-convex form, domed adjacent the point 39 and more or less toroidal around it, whereby this reaction is met with maximum strength and rigidity to distribute it into the body structure.

It will be seen that, by providing the laterally separated trailing arm supports 60 for the front wheels 62 and by locating the major part of the power plant in front of the front wheel axles and between the trailing arms, the power plant as a whole can be carried nearer the ground than in present day automobiles, thus further contributing to lowering the center of gravity of the car as a whole and also carrying the center of gravity further forward to obtain an "arrow" stability, i. e., to assure that the rest of the car will follow the steering wheels even when traction is lost in a skid, and will not swing around.

The lowering of the power plant also permits a lower hood top; and this plus the location of the wheels at the rear of the engine I have turned to advantage by sloping the forward section of the car from the cowl to the front tip so that the driver gets a full view of the road to only a few feet in front of the car.

As will be noted from the foregoing description and drawings, the platform or passenger seating part of the body is preferably the full width of the car extending to the outside of the wheels so that each seat will comfortably seat three passengers.

It will be seen from the foregoing description that in designing the self-framing body structure of the present invention so that it constitutes essentially a beam shaft no account has been taken of the roof or top of the passenger body. In an "open" model or "convertible," this is necessary; and even in the closed "sedans" and "coupes," etc., the top is essentially a roof and impact shield. Torsion and bending cannot be satisfactorily transmitted from the platform or passenger seating part of the body to the roof or top. Any attempt to do so results in impaired visibility. Safety demands that the supporting posts for the roof should be narrower than the normal distance between a man's eyes (about 2½").

With this embodiment of the present invention, the top may be of any suitable design and may be attached to the self-framing body structure by brackets, telescoping parts or otherwise. In the illustrative embodiment of the invention a simple top construction is shown in which longitudinally extending tubular frame pieces 102 at each side are arched to provide head room and space for the doors. These are attached to the unitary body structure at points behind the rear seat and at the outer corners of the cowl. These frame members may be of any beam shape to provide the required resistance to bending and the domed steel top 106 may be welded thereto to make an integral top structure provided with a front window 108 and a rear window 110. The ends of the frame members 102 are received in holes in the upper shell 2 and are welded in place and their lower ends which extend against the lower shell 4 may be spot welded thereto. The edge of the top 106 where it meets the shell 2 may be welded or brazed to give greater strength and a smooth joint which will hold a fine finish without cracking.

The top and nose portion of the car will preferably be so designed as to offer a minimum of resistance to the air. Since a complete streamline shape is impracticable because it would lead to excessive overall car length (at least 30 feet for a car that is 5 feet high), I prefer to utilize what might be termed a "front half streamline" shape. In such a design the portion of the car from the highest point of the roof forward is shaped essentially as the front half of an airfoil. Such halfstreamline shape puts the center of wind pressure as far back as possible; and this, with the center of gravity brought forward, by reason of the location of the power plant in front of the front wheel axles, gives a maximum "arrow stability." The relatively flat transverse top does away with sideways "lift" or side wind instability in a cross wind and the downward component of the wind pressure on the sloping nose will in fact add to the front wheel traction when it is most needed, that is, at high speed.

By this design having the front half of the car carefully streamlined so as to give the smoothest possible air flow over the body and without attempt to approximate an airfoil in the rear portion, I secure a quieter car. Modern automobiles by their rough approximation to streamlining have brought the air flow close to the body where it produces excessive wind roar at high speeds, which was not present with the older box-like designs because of the large parasite mass of dead air which they pushed along with them. The present streamlining, however, is not—and, for reasons set forth above, cannot be—sufficiently perfect to give quiet flow over the body when travelling at high speeds. With my design, by concentrating on streamlining only the front half, I get much quieter flow and by combining this with a suitable form for structural, comfort and visibility considerations, the flow leaves the body with a vacuum "cushion" over the rear to insulate it from the "burble" noises.

In ordinary cars the air resistance of the underside of the frame and body structure is far in excess of that on the upper exposed surfaces. The frame members, springs, tanks, axles, etc., present an altogether cluttered array of obstructions and turbulence pockets to give a maximum air drag against the road. The smooth stamping of the underbody in the present invention is in contrast. Piping, wiring, etc. can be carried through the box beams 6 and 8 advantageously, being laid into the lower shell 4 before the two shells 2 and 4 are welded or otherwise secured together. The gasoline tank is advantageously made of such shape that it fits the recess in the underbody and contributes to the smooth streamline form of the underbody; or, if that is not convenient, a cover may be added to give such form to the underbody.

Except for the several recesses provided for mounting the parts which are to be carried on the body, it is smoothly curved in all directions, with "second degree" smoothness (i. e., gradual changes only in radius of curvature) throughout, and approximates an egg shell form.

Not only may the hollow parts of the frame and body structure of the present invention be used to enclose the wiring and conduits for gasoline, brake fluid, etc. but the hollow shell itself may be used as ducts for introducing fresh air into the passenger compartment, as, for example, by providing openings 116 at the front or at unstressed areas at the sides or bottom, and suitably controlled openings from the interior of the shell into the passenger compartment.

To insure long life of the combined frame and body structure of the present invention, the assembly shown in Figure 3, while the front end of the structure is still open, may be dipped in any suitable coating liquid which will coat both the inside and the outside and render it resistant to corrosion. Moreover, drainage openings may be provided through the shell at low points to drain any liquid which may get into the interior of the body through any of the necessary openings. Such drainage openings are not large enough to detract to any appreciable extent from the strength of the structure and can be located in substantially unstressed areas.

Glove, radio and instrument cases or compartments can be inserted in the dashboard by cutting out the necessary holes, preferably in relatively unstressed areas or supporting the opening by the inserted box. As shown in Figure 8, such a hole extends across the right hand side of the dashboard and inserting a glove compartment box, which is latched in place. Smaller holes are cut on the left side in which the instruments are mounted; and the right hand hole gives access to their backs for connecting and disconnecting.

In the same manner cowl ventilators, access openings, etc., may be provided as required. If desired, an instrument panel may be made up as a unit and inserted into a single opening in the dash as close to the normal line of view as possible.

From the foregoing description it will be seen that the combined frame and passenger body structure of the present invention, which in its entirety is essentially a beam shaft, presents many important advantages over the present day automobile frame and body structures. Not only is the weight substantially reduced for a given structural strength, with corresponding savings in material cost and operating expenses, but there is a marked increase in stability, comfort and convenience and especially in the safety against serious accidents.

As hereinabove pointed out, resistance to bending requires flange height, or, ideally, an I beam. Resistance to twisting requires an enclosed area or a tube. The combination of the two in a beam shaft would then be an elliptical tube. The body structure of the present invention in its entirety approximates an elliptical tube flattened and pinched to provide space for the necessary components of the automobile and the passenger accommodations. An important feature of the invention, therefore, is that the provision of such space has been effected without loss of the prime requirement of structural resistance, namely, the greatest distance possible from the axis of deformation to the active structural material.

To illustrate some of the practical advantages obtained by the structure of the present invention, assume a cold rolled sheet steel shell of thickness .06″ or about $\frac{1}{16}$″. A self-framing body shell such as herein shown for a six-passenger automobile would then have a weight about one-half the weight of the corresponding parts of a standard passenger automobile of the same capacity. The empty, so-called "curb" weight of a complete standard passenger automobile is about 3300 pounds, of which 1500 pounds is the weight of the mechanical components, 300 pounds the weight of the seats and other interior parts, while the remaining 1500 pounds is what can properly be called structure (although not a very efficient structure since it comprises a strong, but not stiff, truss type frame surrounded by fragile sheet metal skin which has been forced to become a part of the structure by reason of necessarily rigid connections). A complete automobile such as herein shown, by reason of its use of substantially all the material in structural parts and its elimination of separate framing, lighter and stronger combined frame and body structure and the simpler and lighter front and rear suspension and transmission assemblies, would have its curb weight for the same capacity reduced by nearly 1000 pounds, e. g., to a curb weight of about 2000 pounds as compared with the 3000 pounds curb weight of the present standard passenger automobile. These weight figures do not take into consideration the consequent savings in the weight of the power plant and transmission elements required for identical performance in such a lighter car.

Aluminum alloy of the types used in aircraft of about $\frac{3}{32}$″ thickness can be used instead of $\frac{1}{16}$″ steel with further weight reduction. Other sheet materials such as plastics, indurated fibrous sheets, etc., can also be used.

Among the more detailed advantages of the novel construction of the present invention is the complete integration of the body shell and bumpers, the body, made of sheet steel of a thickness corresponding to that used in present day bumpers, being essentially all bumper. It may here be added that, where desired, bright metal guards or rubber pads, etc., may be arranged on the more exposed parts of the body to protect the body finish in parking, such a guard for example covering the weld seam 54 as illustrated at 55 in Figure 23, and if desired having a rubber backing.

Another advantage of the construction which has already been mentioned above, results from the incorporation of the fenders in the self-framing body structure itself, namely that coil springs, for taking up the wheel reaction, can have a much longer space to operate in than those employed with present day automobiles and thus give superior riding qualities.

As hereinabove pointed out, the lower faces of the fender parts of the shell structure are recessed to receive the coil springs, suspension arms and motor mountings, thus acquiring increased local strength through the sharp curvature at the recesses.

Still another important advantage of the novel structure herein shown and described is the reduction of the wheel suspension to the simplest and most robust form, each wheel being carried on a single independent trailing arm having a pivotal or hinge mounting in a sleeve fastened into a dimple. Although this hinge connection is herein shown as inclined to the longitudinal axis of the car body to increase the roll resistance, it will be understood that, by a change of the direction of this axis of swing, the characteristics of any other form of wheel support may be had, from the non-gyroscopic action of up and down motion of the wheel in its own plane to the roll resistance of a wheel moving in an arc of a circle around the longitudinal axis of the car, as herein shown and described. This particular wheel support requires extreme rigidity of the structure forward of the front wheels, a feature provided by the novel structure of the present invention but found in no other existing frame and body structure.

Although, in the illustrative embodiment of the invention, the upper and lower shells 2 and 4 are each shown as formed from a single piece of sheet steel and so designed that each may be preformed into its desired shape by a single stroke of the hydraulic press, it will be understood that the invention is not limited to this particular way of preforming the shells nor to preforming each shell from a single sheet.

Thus in Figures 28 and 29 is shown another embodiment in which the top and outer part of the body are made in a unit and a third piece is the inner body part. The two ends of the car in this case are essentially the same as in the case described above, but in this case the floor and underbody are one piece while the third piece cut out as shown merely closes the longitudinal box beams 8a and the transverse box beams 9a and 12a. These parts are made to fit together edge-to-edge and welded along their edges, to give a continuous structure.

Although I have described the invention in connection with front engine, front wheel drive automobiles, it should be obvious from what has been said that the same type of self-framing body and the same toroidal motor support well, etc., and the same wheel mounting and springing can be used with engine front or rear and with front or rear drive. Some of the advantages of the invention can be obtained with conventional axles and wheel mountings and the self-framing body of the type herein set forth; and likewise other features set forth above may be used individually but generally with less advantage than in the combination as set forth.

I claim:

1. A self-framing body structure for private passenger automobiles which comprises an under body section and an upper body section secured together, said sections combining to form integral body-long box beams extending along the body at each side thereof and continuing in curved end portions over the wheels to form fenders, said box beams being formed by overlapping spaced portions of said sections respectively and longitudinally engaging portions on said sections, and said sections also forming an integral body-wide cross box beam by overlapping portions of said sections each constituting an opposite side thereof and being secured together in said box beam structure, said body-long box beams being connected by said cross beams, said upper and under body sections between said fender portions near one end having registering apertures and having between said apertures an annular wall surrounding a space for mounting a motor, and having transverse walls spaced fore and aft, respectively, from said annular wall, whereby said annular wall, transverse walls and fender portions constitute a toroidal ring around said motor space, and motor mounting means on said ring adjacent said motor space.

2. A self-framing body structure for private passenger automobiles which comprises an under body section and an upper body section secured together, said sections combining to form integral body-long box beams extending along the body at each side thereof and continuing in curved end portions over the wheels to form fenders, said box beams being formed by overlapping spaced portions of said sections respectively and longitudinally engaging portions on said sections, and said sections also forming an integral body-wide cross box beam by overlapping portions of said sections each constituting an opposite side thereof and being secured together in said box beam structure, said body-long box beams being connected by said cross beams, said upper and under body sections between said fender portions near one end having registering apertures and having between said apertures an annular wall surrounding a space for mounting a motor, and having transverse walls spaced fore and aft, respectively, from said annular wall, whereby said annular wall, transverse walls and fender portions constitute a toroidal ring around said motor space, motor mounting means on said ring adjacent said motor space, and means on the exterior of said ring to which wheel suspension members may be secured.

3. A self-framing body structure as defined in claim 2 wherein the axis of the wheel-receiving space of said fender portions is rearward of the center of said motor space.

4. A self-framing body structure for private passenger automobiles as defined in claim 1, the front of said toroidal ring having registering openings through its walls and an annular wall connecting said openings whereby said front end constitutes a cross beam structure of toroidal form with its axis longitudinal of the automobile and with a forwardly directed mouth open to provide for inflow of cooling air into said motor space.

5. A self-framing body structure for private passenger automobiles as defined in claim 4, wherein openings are provided at the opposite sides of the mouth for mounting of headlamps within said mouth whereby they are protected from minor collisions by the front edge of said toroidal ring and wiring connections will be carried to them through the interior of said ring.

6. A private passenger automobile which comprises a self-framing body structure having an under body section and an upper body section secured together, said sections combining to form integral body-long box beams extending along the body at each side thereof and formed by overlapping spaced portions of said sections respectively and longitudinally engaging portions on said sections, and said sections also forming an integral body-wide cross box beam by overlapping portions of said sections each constituting an opposite side thereof and being secured together in said box beam structure, said body-long box beams being connected by said cross beams and which is further characterized by the box beams and cross beams extending substantially continuous around the periphery of the body.

7. A private passenger automobile which comprises a self-framing body structure having an under body section and an upper body section secured together, said sections combining to form integral body-long box beams extending along the body at each side thereof and formed by overlapping spaced portions of said sections respectively and longitudinally engaging portions on said sections, and said sections also forming an integral body-wide cross box beam by overlapping portions of said sections each constituting an opposite side thereof and being secured together in said box beam structure, said body-long box beams being connected by said cross beams and which is further characterized by one of the cross beams being located at the front of a passenger space where it forms the dashboard and cowl, another of said cross beams being at the rear of the passenger space where it forms a bulkhead between the passenger and luggage compartments and a third being within said passenger space and spaced rearwardly from said dashboard portion where it forms a raised platform for a seat, thus giving crash protection to the passenger compartment.

8. In a passenger automobile a self-framing body structure having an underbody section and an upper body section secured together, said sections combining to form integral body-long box beams extending along the body at each side thereof and formed by overlapping spaced portions of said sections respectively and longitudinally engaging portions on said sections, and said sections also forming an integral body-wide cross box beam by overlapping portions of said sections each constituting an opposite side thereof and being secured together in said box beam structure, said body-long box beams being connected by said cross beams and the underbody and upper body sections each being body-long and body-wide and combining to form all of said beams, and a top section being secured to said upper body section at the front and rear of the passenger space on the tops of cross beams located respectively at those positions.

9. In a passenger automobile a self-framing body structure having an underbody section and an upper body section secured together, said sections combining to form integral body-long box beams extending along the body at each side thereof and formed by overlapping spaced portions of said sections respectively and longitudinally engaging portions on said sections, and said sections also forming an integral body-wide cross box beam by overlapping portions of said sections each constituting an opposite side thereof and being secured together in said box beam structure, said body-long box beams being connected to said cross beams and said underbody and upper body sections being each body-long and body-wide and each being a single drawn sheet metal stamping, and by their being secured together at their edges into a unitary beam-shaft structure.

10. In a passenger automobile the body structure as defined in claim 9, which is further characterized by the sheet metal of which said body stampings are made being of stiffness at least equal to sheet steel of one-sixteenth inch thickness.

11. A private passenger automobile which comprises a self-framing body structure as defined in claim 1 which is further characterized by said underbody and upper body sections being welded together into a unitary beam shaft structure having a tubular opening from end to end whereby wiring, cables and piping may be carried in the body structure and protected from external damage, the bottom of the underbody being substantially smooth in a fore and aft direction for stream-line air flow to minimize air drag along the road.

HENNING KARLBY.

References Cited in the file of this patent

UNITED STATES PATENTS

| Number | Name | Date |
|---|---|---|
| 872,031 | Thomas et al. | Nov. 26, 1907 |
| 1,290,958 | Foster | Jan. 14, 1919 |
| 1,473,194 | Mayer | Nov. 6, 1923 |
| 1,781,322 | Delling | Nov. 11, 1930 |
| 1,887,666 | Van Ranst | Nov. 15, 1932 |
| 2,071,592 | Thompson | Feb. 23, 1937 |
| 2,190,551 | Swallow | Feb. 13, 1940 |
| 2,254,497 | Schafer | Sept. 2, 1941 |
| 2,271,310 | Schafer | Jan. 27, 1942 |
| 2,284,988 | Reid | June 2, 1942 |
| 2,344,896 | Phelps | Mar. 21, 1944 |
| 2,358,663 | Scott-Iversen | Sept. 19, 1944 |
| 2,495,090 | Borden | Jan. 17, 1950 |
| 2,497,252 | Adams | Feb. 14, 1950 |
| 2,499,495 | Gregory | Mar. 7, 1950 |
| 2,525,339 | Chausson | Oct. 10, 1950 |

FOREIGN PATENTS

| Number | Country | Date |
|---|---|---|
| 762,366 | France | Jan. 22, 1934 |
| 852,494 | France | Oct. 30, 1939 |
| 940,939 | France | June 14, 1948 |